(12) United States Patent
Kozak

(10) Patent No.: US 11,077,912 B2
(45) Date of Patent: Aug. 3, 2021

(54) VEHICLE WHEEL AXLE

(71) Applicant: Mariusz Kozak, Świdnik (PL)

(72) Inventor: Mariusz Kozak, Świdnik (PL)

( * ) Notice: Subject to any disclaimer, the term of this patent is extended or adjusted under 35 U.S.C. 154(b) by 279 days.

(21) Appl. No.: 16/316,754

(22) PCT Filed: Jul. 11, 2017

(86) PCT No.: PCT/IB2017/054173
§ 371 (c)(1),
(2) Date: Jan. 10, 2019

(87) PCT Pub. No.: WO2018/011709
PCT Pub. Date: Jan. 18, 2018

(65) Prior Publication Data
US 2020/0180726 A1   Jun. 11, 2020

(30) Foreign Application Priority Data
Jul. 11, 2016   (PL) .......................... 417916

(51) Int. Cl.
*B62K 25/02*   (2006.01)
*B60B 27/02*   (2006.01)
*B60B 35/00*   (2006.01)

(52) U.S. Cl.
CPC ............ *B62K 25/02* (2013.01); *B60B 27/023* (2013.01); *B60B 35/005* (2013.01)

(58) Field of Classification Search
CPC .......................... B62K 25/02; B62K 2025/025; B60B 27/023; B60B 27/026; B60B 35/005
See application file for complete search history.

(56) References Cited

U.S. PATENT DOCUMENTS

| | | | | | |
|---|---|---|---|---|---|
| 3,919,898 | A | * | 11/1975 | Sugino | B62M 3/003 74/594.2 |
| 4,408,786 | A | * | 10/1983 | Stuemky | F16L 33/2076 285/256 |
| 5,536,098 | A | * | 7/1996 | Schwarzler | F16C 35/0635 403/259 |

(Continued)

FOREIGN PATENT DOCUMENTS

| | | |
|---|---|---|
| EP | 0191710 A2 | 8/1986 |
| EP | 2123549 A2 | 11/2009 |

(Continued)

OTHER PUBLICATIONS

International Search Report issued for PCT/IB2017/054173, dated Oct. 27, 2017.

(Continued)

*Primary Examiner* — Minnah L Seoh
*Assistant Examiner* — Michael R Stabley
(74) *Attorney, Agent, or Firm* — Westman, Champlin & Koehler, P.A.; Z. Peter Sawicki; Amanda M. Prose

(57) ABSTRACT

The invention solves the issue of stiff mounting of a wheel to a bicycle frame. The essential feature of the invention is that in the seating nests of the axle are bulges and hollows with slanting surfaces. The outer contour of the axle's wall section, which is parallel to the wheel symmetry plane which goes through the slanting surface, has a non-circular shape, preferably the shape of a regular polygon or similar to a regular polygon or an irregular polygon or the shape of an irregular closed curve.

5 Claims, 4 Drawing Sheets

(56) References Cited

U.S. PATENT DOCUMENTS

Figure 1:
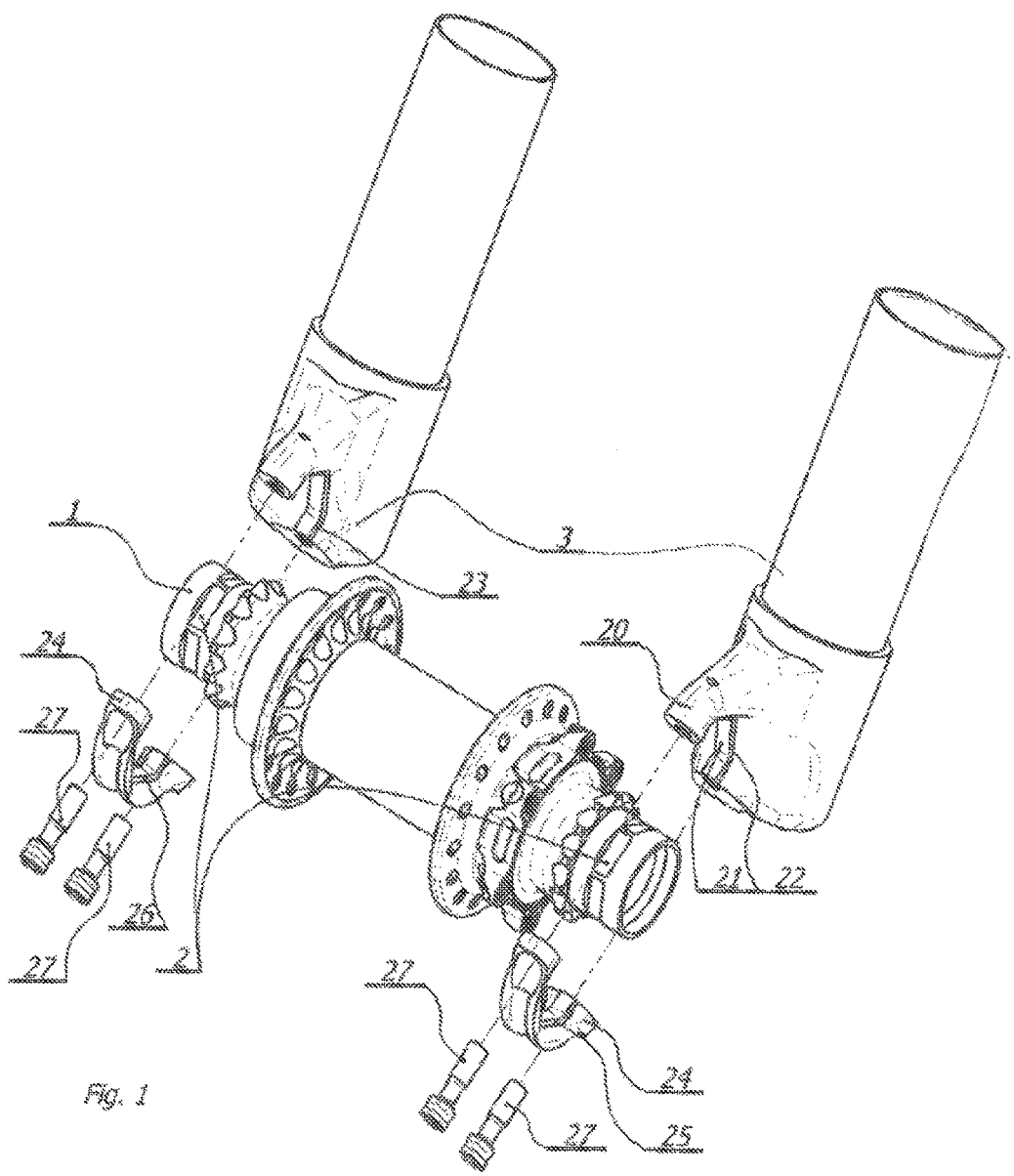

| | | | |
|---|---|---|---|
| 6,412,803 B1 | 7/2002 | Lalikyan | |
| 7,494,145 B2* | 2/2009 | Schroeder | B60B 27/026 |
| | | | 280/276 |
| 8,113,594 B2* | 2/2012 | Jones | B62K 25/02 |
| | | | 301/124.2 |
| 9,376,160 B2* | 6/2016 | Pye | B60B 27/023 |
| 2002/0140201 A1 | 10/2002 | Kirk | |
| 2004/0036251 A1 | 2/2004 | Baldwin | |
| 2006/0087096 A1 | 4/2006 | Turner | |
| 2008/0116658 A1 | 5/2008 | Schroeder | |
| 2009/0315295 A1* | 12/2009 | Laird | B62K 25/02 |
| | | | 280/279 |
| 2012/0228851 A1 | 9/2012 | Chen | |
| 2012/0256475 A1* | 10/2012 | Laird | B62K 25/02 |
| | | | 301/124.2 |
| 2015/0130263 A1* | 5/2015 | Laird | B60B 27/026 |
| | | | 301/124.2 |
| 2015/0246706 A1 | 9/2015 | Pye | |
| 2017/0239985 A1* | 8/2017 | Laird | B62K 25/02 |

FOREIGN PATENT DOCUMENTS

| | | |
|---|---|---|
| EP | 2565052 A2 | 3/2013 |
| EP | 2653294 A1 | 10/2013 |
| JP | S52133448 U | 10/1977 |
| TW | M451309 U | 4/2013 |

OTHER PUBLICATIONS

Written Opinion of the International Searching Authority issued for PCT/IB2017/054173, dated Oct. 27, 2017.

* cited by examiner

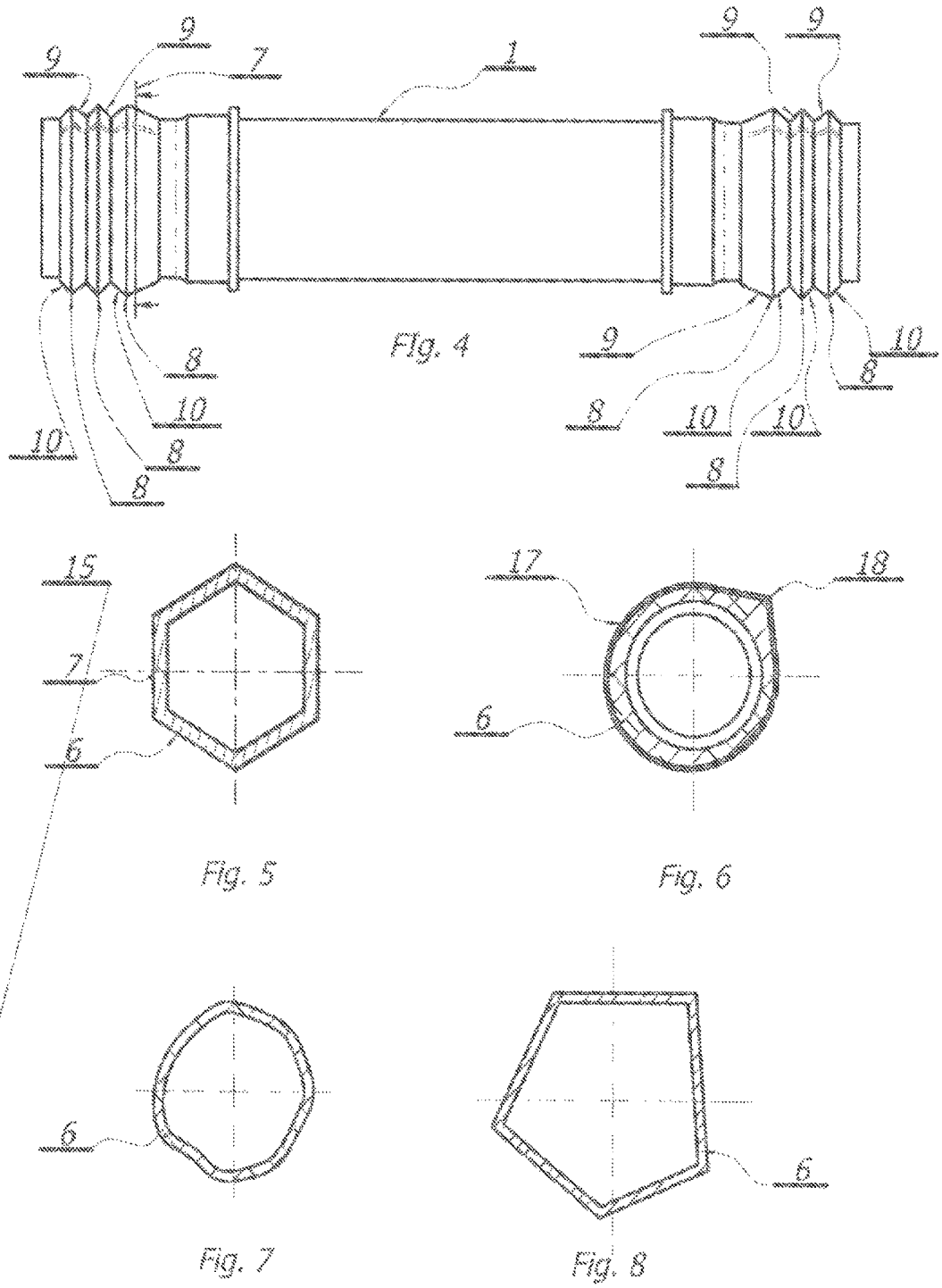

VEHICLE WHEEL AXLE

CROSS-REFERENCE TO RELATED APPLICATION

This Application is a Section 371 National Stage Application of International Application No. PCT/IB2017/054173, filed Jul. 11, 2017, and published as WO 2018/011709 A1 on Jan. 18, 2018, in English, which claims priority to and benefits of Polish Patent Application Serial No. P.417916, filed with Patent Office of the Republic of Poland on Jul. 11, 2016, the contents of which are hereby incorporated by reference in their entirety.

The subject of the invention is a vehicle wheel axle, in particular for a bicycle.

A significant problem in the design of a bicycle is the mounting of wheels to the frame in such way that will produce stability and rigidity of the assembly. Essentially stable mounting should not allow any movement of the axle in relation to the fork or the rear rocker. There exist many known designs of this assembly, which points to the difficulty in obtaining an effective solution for securing a wheel to a fork. An assembly is known from American patent description No. US 20060087096 of a connection of an axle and the fork legs where the leg sits from the top on the axle, and the axle is secured from below with a hemispherical clamp attached hinge-wise on one end to the fork leg and from the other end it has a swivel lock connected eccentrically with a clamp lever. Also an assembly is known from a published patent description No. US20150246706 of a connection of an axle with fork legs. The axle is secured to a mounting structure with a bolt. The bolt is nested in a retainer secured to the mounting structure. The axle has other than circular surface engaging a meshing noncircular surface of the mounting structure. A retainer is installed in a threaded section of the mounting structure.

From the published description of patent No. EP 256505 there is known a front wheel axle with bolt-retained rings with teeth on their outer sides to which the inner flat sides of the fork are adjacent. The fork is secured to those rings with a skewer having a lever with a cam.

According to the wheel axle invention, in its nest there are bulges and hollows with reversely slanting surfaces. The outer contour of the axle's wall section which is parallel to the wheel symmetry plane and which goes through every slanting surface has non-circular shape, preferably the shape of a regular polygon or a shape similar to a regular polygon or an irregular polygon or the shape of an irregular closed curve.

According to a variant solution, in the seating nests of the axle there are around its circumference narrowings with a V-shaped contour, whose side surfaces are positioned slanting inwards in the direction of the middle of the narrowing. The outer contour of the axle's wall section which is parallel to the symmetry plane of the wheel and which goes through every slanting surface, has a non-circular shape, preferably the shape of a regular polygon or similar to a regular polygon or an irregular polygon or the shape of an irregular closed curve.

According to a different variant, the axle seating nests have a bulge with two opposing slanting surfaces, while the outer contour of the axle wall at the place of the wall's section, parallel to the wheel plane and going through the slanting planes, has the shape of a regular polygon or similar to a regular polygon or an irregular polygon or the shape of an irregular closed curve.

Another variant of the axle has in the seating nests on its circumference sawtooth-like bulges. The outer contour of the axle's wall section which is parallel to the symmetry plane of the wheel and which goes through every slanting surface has a non-circular shape, preferably the shape of a regular polygon or similar to a regular polygon or an irregular polygon or the shape of an irregular closed curve.

Preferably the outer contour of the wall of the axle's cross section at the place of the narrowing or the bulge through one slanting surface is a mirror reflection of the contour of the other slanting surface.

Preferably the outer contour of the sections of the axle's walls parallel to the wheel plane, going through the slanting surfaces of the narrowing or the bulge, at one end of the axle constitutes a mirror reflection of the contour of the section at the other end of the axle.

Preferably the slanting surfaces of the narrowings or bulges in the axle nests are secured to the fork leg with an elastic tape fitted with stiff pads whose shapes mesh with those of the surface of the axle.

The solution according to the invention eliminates a complicated assembly for clamping the side surfaces of the fork. The axle having slanting narrowings or bulges is firmly secured only by a clamping collar or a clamp. This solution eliminates the assembly for clamping fork dropouts to the axle from the sides, at the same time it limits the degree of freedom in three perpendicular planes.

Figure 2:
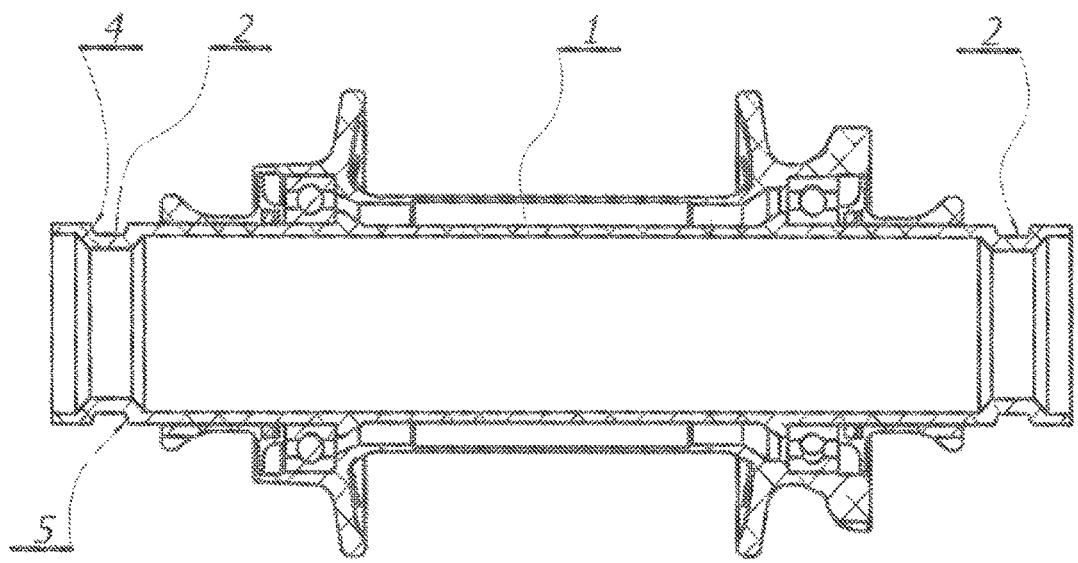
Figure 3:
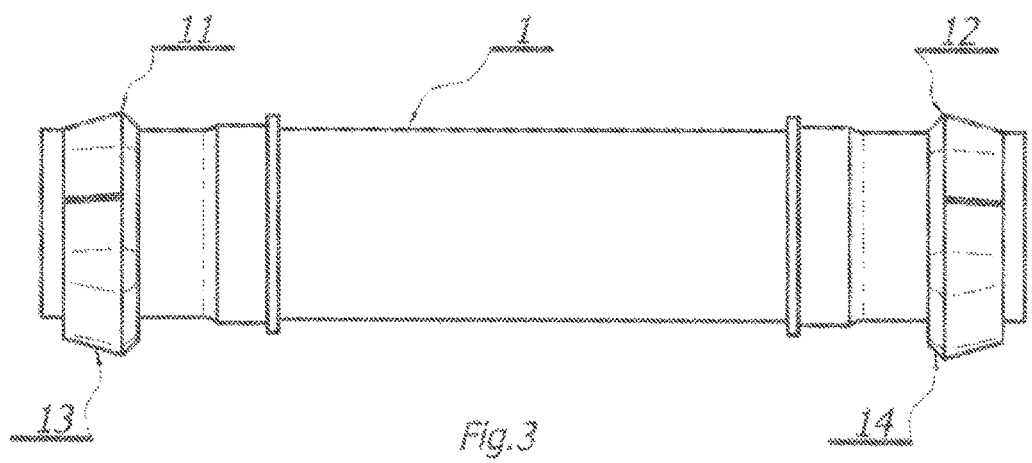
Figure 9:
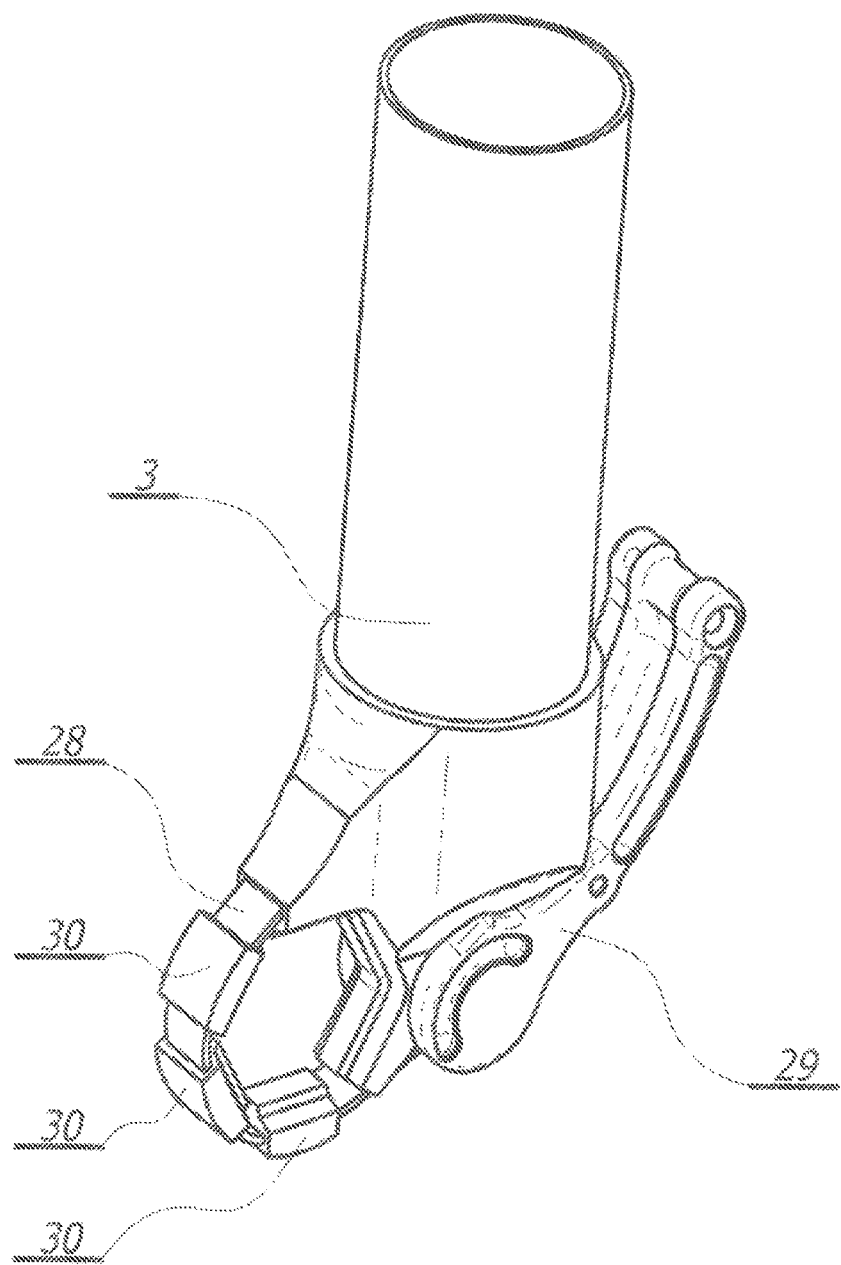

The subject of the invention is presented in an example version in the drawing in which FIG. 1 presents an exploded isometric view of the hub assembly with the securing elements, FIG. 2 hub section perpendicular to the axle with narrowings, FIG. 3 a view with a formed bulge, FIG. 4 a view of the axle in the sawtooth-like contour, FIG. 5 axle section through a slanting surface with the contour of a regular hexagon, FIG. 6 axle section through a slanting surface with the contour of an oval with a vertex, FIG. 7 section of the axle's slanting surface with the contour of a curve, FIG. 8 section of a slanting surface with the contour of an irregular polygon and FIG. 9 the axle's seating nest.

An axle 1 in the form of a tube made of a composite material has on its circumference at both ends identical, circular narrowings 2 forming V-shaped grooves which are positioned according to the fork legs 3. Slanting surfaces 4 and 5 of each narrowing 2 are convergent inwards.

In another variant of the axle 1 shown in FIG. 4 the seating nests of the axle 1 have bulges 8 with a sawtooth-like contour and with slanting surfaces 9 and 10.

FIG. 3 presents the axle 1 which has on narrowed ends 11 a bulge 12 with two slanting surfaces 13 and 14 with opposing slants.

As shown in FIG. 5, the outer contour 6 of wall section 7, parallel to the wheel symmetry plane and going through the slanting surface 4 of the narrowing 2, has the shape of a regular hexagon. The other slanting surface 5 has identical outer contour 6 of the wall 7, which is a mirror reflection. The slanting surfaces 4 and 5, having a non-circular contour in their section, determine the longitudinal and lateral orientation of the wheel in relation to the bicycle frame.

Other example shapes of the outer contour 6 of the wall 7 section of the axle 1 parallel to the wheel symmetry plane and going through slanting surfaces 4, 5, 9, 10, 13 and 14 are shown in FIG. 6, FIG. 7 and FIG. 8. FIG. 6 presents the contour 6 which is an oval 17 with a vertex 18 and it refers to all slanting surfaces 4, 5, 9, 10, 13 and 14. FIG. 7 presents the outline 6 of a section in the shape of an irregular curve and FIG. 8 shows the outline 6 in the shape of an irregular polygon and it may occur in all the aforementioned contours of the axle 1 seating nests.

The presented examples do not exhaust other shapes of the contour of the slanting surfaces.

FIG. 1 presents axle 1 mount with ribs having the contour 6 of a hexagon. The fork 3 ends with a hook 20 having a nest 21 with a contour of a semi-hexagon with slanting surfaces 22 and 23 on the edges of the nest 21 whose angle equals the angle of the slanting surfaces 4 and 5 on the axle 1. Also the nest of the clamping collar 24 has the contour of a fragment of a hexagon with slanting edges 25 and 26. The mounting collar 14 is connected to the hook 20 with bolts 27.

According to a different solution, which is presented in FIG. 9, the axle 1 is mounted to the fork 3 with an elastic tape 28 which is secured with a lever 29. The tape 28 has stiff pads 30 whose surface abutting the axle 1 meshes with the contour of the slanting surfaces 4 and 5.

The invention claimed is:

1. A vehicle wheel axle in the form of a tube made of metal or carbon fibre-reinforced composite material, wherein in seating nests of the axle comprise bulges and hollows with reversely slanting surfaces, while an outer contour of a section of the axle wall being parallel to a symmetry plane of the wheel, which goes through the slanting surfaces, has a non-circular shape and wherein the axle is seated in a hook of a frame for the reversely slanting surfaces and is secured with an elastic tape having stiff pads which have a shape that meshes with the slanting surfaces of the axle.

2. The vehicle wheel axle according to claim 1 wherein in the seating nests has a circumference and around the circumference are V-shaped narrowing whose side surfaces are situated askew inwards in the direction of the centre of the narrowings, and whereas the outer contour of the wall section of the axle is parallel to the symmetry plane of the wheel going through the slanting surface and wherein the non-circular shape is that of a regular polygon, an irregular polygon, or the shape of an irregular closed curve.

3. The vehicle wheel axle according to claim 1 wherein the seating nests have on their circumference bulges comprising a sawtooth shape, whereas the outer contour of the section of the axle wall, parallel to the wheel symmetry plane which goes through the slanting surface of the bulges has the non-circular shape that is the shape of a regular polygon, an irregular polygon, or the shape of an irregular closed curve.

4. The vehicle wheel axle according to claim 1 wherein the seating nests have on their circumference a bulge which comprises two slanting surfaces, and whereas the outer contour of the section of the axle wall, parallel to the wheel symmetry plane which goes through the slanting surface has the non-circular shape that is the shape of a regular polygon, an irregular polygon, or an irregular closed curve.

5. The vehicle wheel axle according to claim 1, wherein the outer contour of the wall sections parallel to the wheel symmetry plane which goes through the slanting surfaces on one end of the axle is a mirror reflection of the contours of those wall sections on the other end of the axle.

* * * * *